United States Patent
Chundury et al.

(10) Patent No.: US 6,518,344 B1
(45) Date of Patent: Feb. 11, 2003

(54) FLAME RETARDED POLYOLEFIN COMPOSITION

(75) Inventors: Deenadayalu Chundury, Newburgh, IN (US); Ann Mendel, Evansville, IN (US); Howard E. Munro, Wadesville, IN (US); Roy C. Sanford, Dale, IN (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/640,876

(22) Filed: Aug. 18, 2000

(51) Int. Cl.$^7$ .................................................. C08K 3/00
(52) U.S. Cl. ........................ 524/303; 524/147; 524/153; 524/281; 524/303; 524/304; 524/371; 524/373; 524/397; 524/399; 524/400; 524/405; 524/410; 524/411; 524/412; 524/414; 524/436; 524/151; 524/152
(58) Field of Search ................................. 524/371, 373, 524/436, 397, 399, 400, 303, 304, 281, 147, 153, 410, 411, 412, 424, 405, 414

(56) References Cited

U.S. PATENT DOCUMENTS

| | | | | |
|---|---|---|---|---|
| 3,409,587 A | * | 11/1968 | Mills ........................... 524/304 |
| 3,414,532 A | * | 12/1968 | Hecker et al. ............... 524/304 |
| 3,432,461 A | * | 3/1969 | Hill et al. |
| 3,487,044 A | * | 12/1969 | Tholstrup ................... 524/304 |
| 3,558,554 A | * | 1/1971 | Kuriyama et al. ........... 524/153 |
| 3,622,530 A | * | 11/1971 | Brianchesi ................. 524/304 |
| 3,730,929 A | * | 5/1973 | Breza |
| 3,849,352 A | * | 11/1974 | Reed et al. |
| 4,089,912 A | * | 5/1978 | Lever et al. ................. 524/180 |
| 4,187,212 A | * | 2/1980 | Zinke et al. ................. 524/153 |
| 4,401,783 A | * | 8/1983 | Kotian ........................ 524/371 |
| 4,675,356 A | * | 6/1987 | Miyata ........................ 524/436 |
| 5,079,283 A | | 1/1992 | Burditt et al. ................. 524/94 |
| 5,155,153 A | * | 10/1992 | Neri et al. ................... 524/304 |
| 5,180,767 A | * | 1/1993 | Sakai et al. ................. 524/411 |
| 5,194,482 A | | 3/1993 | Chundury et al. ........... 524/412 |
| 5,703,149 A | * | 12/1997 | Rotzinger et al. .......... 524/119 |
| 5,874,513 A | * | 2/1999 | Watanabe ................. 526/348.1 |
| 5,955,522 A | * | 9/1999 | Rotzinger et al. .......... 524/119 |
| 6,197,864 B1 | * | 3/2001 | Borke et al. ................. 524/436 |
| 6,221,472 B1 | * | 4/2001 | Nosu et al. ................. 524/437 |
| 6,346,581 B1 | * | 2/2002 | Tsunogae et al. ........... 525/211 |

* cited by examiner

*Primary Examiner*—Peter Szekely
(74) *Attorney, Agent, or Firm*—Rankin, Hill, Porter & Clark LLP

(57) ABSTRACT

The present invention provides a new and improved flame retarded polyolefin composition that displays good retained physical properties upon aging. The composition also exhibits excellent moldability and it may be easily colored. In a preferred embodiment the composition includes a polyolefin, a halogen-containing flame retardant additive, from at least about 1.00% by weight to about 2.5% by weight of a stabilizer package, and from about 0% to about 1.0% by weight of an acid/halogen scavenger. The stabilizer package includes by weight from about 20% to about 80% of a hindered phenolic antioxidant, from about 20% to about 80% of a phosphite containing antioxidant, and from about 0% to about 40% of a thio-ester antioxidant. In addition to displaying excellent color and physical property development and retention characteristics, the composition of the present invention displays an improved UL94 vertical burn rating.

25 Claims, No Drawings

FLAME RETARDED POLYOLEFIN COMPOSITION

FILED OF INVENTION

The present invention concerns a polyolefin composition. More particularly, the present invention concerns a flame retarded polyolefin composition that retains good physical properties after long-term heat aging and enhanced as-molded flammability properties.

BACKGROUND OF THE INVENTION

The use of flame retardant additives in polymer resin systems is well-known in the prior art. A number of different flame retardant additive systems are commercially available for incorporation into polymer resin systems or blends. Such additives serve to impart flame retardant/resistant properties to the polymers they are added to, reducing the ease of ignition and decreasing the time for the polymer to extinguish after application and removal of an ignition source.

The use of flame retardant additives in polyolefin systems, such as polypropylene containing and/or based polymer systems, is also well-known in the prior art. Flame retarded polypropylenes are used in a wide variety of applications where flame retarded properties are required. Examples of such applications include, for example, electronic components and parts, household fixtures and accessories such as furniture and fabric, automotive and appliance parts such as control panels, clothes baskets, drums, dashboards, seat covers, and carpeting.

Unfortunately, the use of flame retardant additives in polyolefin compositions, such as polypropylene, can result in a meaningful loss in the physical properties of the composition. The flame retardant additive can detrimentally affect the retention of physical properties of the polyolefin composition, particularly after long-term heat aging. In many applications, this detrimental affect on the retention of physical properties is undesirable and/or unacceptable.

SUMMARY OF INVENTION

The present invention provides a new and improved flame retarded polyolefin composition that exhibits excellent retention of physical properties after long-term heat aging. The composition according to the invention exhibits excellent moldability and may be easily colored. Moreover, the composition exhibits little or no undesirable change in the original as-molded color after long term heat aging or prolonged use at temperatures above normal room temperatures.

In a preferred embodiment the composition comprises: (I) at least one polyolefin; (II) a halogen-containing flame retardant additive; (III) from at least about 1.00% by weight to about 2.5% by weight of a stabilizer package; and (IV) from about 0% to about 1.0% by weight of an acid/halogen scavenger. The stabilizer package (III) comprises by weight from about 20% to about 80% of a hindered phenolic antioxidant (IIIa), from about 20% to about 80% of a phosphite-containing phenolic antioxidant (IIIb), and from about 0% to about 40% of a thio-ester antioxidant (IIIc). In addition to displaying excellent color and physical property retention characteristics upon long-term heat aging, the composition of the present invention displays an improved UL94 burn rating.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

As further discussed in greater detail below, the inventive composition of the present invention comprises a blend of: (I) at least one polyolefin, (II) a halogen-containing flame retardant additive; (III) from at least about 1.00% by weight to about 2.5% by weight of a stabilizer package; and (IV) from about 0% to about 1.0% by weight of an acid/halogen scavenger. Each component of the composition is separately discussed below:

(I) Polyolefin

The flame retarded polyolefin composition according to the present invention comprises at least one polyolefin. Preferably, the polyolefin comprises a conventional semicrystalline homopolymer or copolymer of polypropylene, a metallocene polyolefin or mixtures of such homopolymer, copolymer and metallocene materials. The composition comprises in weight percent from about 26.5% to about 95%, preferably from about 75% to about 93%, and more preferably from about 75% to about 90% of such polyolefin materials.

The number average molecular weight of the polypropylene polymers is preferably above about 10,000 and more preferably above about 50,000. Such polypropylene polymers are preferably produced using a Ziegler catalyst. The polypropylene polymers useful in preparing the polymer blends of the present invention are well-known to those skilled in the art and many are commercially available. Examples of such commercially available semicrystalline polypropylenes include Aristech F007S and F007F, Shell 7C06 and 5A97, Exxon PD7/32, Lyondell X0200 and X0201, Aristech 4007F and 4040F and Union Carbide 7C50 (copolymer of propylene and ethylene). Equistar PP8480HU (ethylene-propylene copolymer), Equistar 51S12A (polypropylene homopolymer) and Quantum PP8479HV.

The polyolefin portion of the composition may also include metallocene polyolefins. Specifically, such polyolefins comprise an ethylene copolymer made using a metallocene catalyst or an equivalent single site metal catalyst. Such copolymers include ethylene-butene, propylene, hexene or octene copolymers made using a metallocene or equivalent single site catalyst. Such ethylene copolymers suitable for use in the present invention display a melting point below about 105° C. Such ethylene-butene or hexene copolymers are available commercially from Exxon Chemicals of Houston, Tex., under the trade designation Exact. An example of another commercially available ethylene copolymer suitable for use in the present invention is a saturated ethylene-octene copolymer sold under the trade designation Engage 8100 or POE-8999 by DuPont Dow Elastomers of Wilmington, Del.

The metallocene ethylene copolymer may be present in the polyolefin portion of the composition in an amount from about 0.5%, or about 1% up to about 30%, or to about 20% by weight of the polyolefin portion of the flame retarded polyolefin composition. Also, it will be appreciated that depending upon the particular application, regrind, recycled or other wide specification materials maybe used to form compositions of the present invention.

(II) Flame Retardant Additive

Various halogen-containing flame retardants may be utilized in the composition. Applicants do not view the selection of a particular type of halogen-containing material as being critical to the invention. Examples of suitable halogen-containing flame retardants include brominated dipentaerithritol, tetrabromobisphenol A, ethylenebistetrabromophthalimide, ethylenebisdibromonorbornane-dicarboximide, tetrabromo-bisphenol A-bis(2,3-dibromopropyl ether), octabromodiphenyl oxide hexabromocyclododecane, hexabromodiphenoxy ethane, decabromodiphenoxy ethane, decabromodiphenyloxide, tris(tribromoneopentyl) phosphate and other halogenated bisphenol derivatives, tetradecabromodiphenoxy benzene, brominated polystyrene, tetradecabromodiphenyloxide, polydibromophenylene oxide, phenoxy terminated bisphenol A carbonate oligomers containing from about 50% to about 60% by weight bromine, brominated epoxy resins containing from about 30% to about 60% by weight bromine, and mixtures thereof.

The halogen-containing flame retardant additive is generally purchased and utilized as a blend in combination with other materials (e.g., a polymer carrier and a synergist). Accordingly, as used in the specification and in the appended claims, the term "halogen-containing flame retardant additive" is intended to reference the halogen-containing flame retardant compound as well as any other materials (e.g., carriers and synergists) that may also be included in the additive as used. For example, Endura 6289 (PP-100) which is available from Polymer Products comprises by weight about 49% to about 54% tetrabrombisphenol A-bis(2,3dibromopropyl ether), from about 25% to about 27% antimony trioxide ($Sb_2O_3$) synergist, from about 19% to about 26% polypropylene carrier, and less than about 1% dispersing agent. Another example is Endura FR6535 available from Polymer Products which comprises by weight from about 57% to about 61% decabromodiphenyl oxide, from about 19% to about 20% $Sb_2O_3$, from about 19% to about 24% polypropylene carrier and less than about 1% dispersing agent. Another example is Endura FR6653 available from Polymer Products which contains by weight from about 57% to about 63% tris(tribromoneopentyl) phosphate, from about 19% to about 20% $Sb_2O_3$, from about 17% to about 24% polypropylene carrier and less than about 1% dispersing agent.

The composition comprises from about 5% to about 25% by weight halogen-containing flame retardant additive, and preferably about 7% to about 22% by weight halogen-containing flame retardant additive.

(III) Stabilizer Package

The flame retarded polyolefin composition according to the present invention also includes from at least about 1.0% to about 2.5% by weight of a stabilizer package. The stabilizer package comprises by weight: (IIIa) from about 20% to about 80% of a hindered phenolic antioxidant; (IIIb) from about 20% to about 80% of a phosphite-containing antioxidant; and (IIIc) from about 0% to about 40% of a thio-ester antioxidant. Examples of suitable hindered phenolic antioxidants (IIIa) for use in the invention include bis(2,2,6,6-tetramethyl-4piperidinyl) sebacate, which is available from Ciba Specialty Chemicals as Tinuvin 770, and tetrakis[methylene(3,5-di-t-butyl-4-hydroxyhydrocinnamate)] methane, which is available from Ciba Specialty Chemicals as Irganox 1010 or from Great Lakes Chemical as Anox 20. An example of suitable a phosphite-containing antioxidant (IIIb) is tris(2,4-di-t-buphenyl) phosphite, which is available from Ciba Specialty Chemicals as Irgafos 168 or from Dover Chemical as Doverphos S-480. And, an example of a suitable thio-ester antioxidant (iiic) is distearyl thiodipropionate.

It will be readily appreciated by those skilled in the art that the stabilizer package loading in the flame retarded polyolefin compositions according to the present invention is substantially higher than the stabilizer package loading in conventional flame retarded polyolefin compositions. Applicants believe that the high loading of a hindered phenolic antioxidant and a phosphite-containing antioxidant leads to the beneficial properties noted herein, particularly when the flame retarded polyolefin composition also includes an acid/halogen scavenger.

(IV) Scavenger

When end users process flame retarded polyolefin compositions, relatively small amounts of thermally labile acid/halogen (i.e., HX, where X is a halogen) can be released by the flame retardant additive. This acid/halogen can attack both the polymer structure of the host resin and/or the processing equipment causing deterioration of the physical characteristics of the host polymer, unwanted color changes in the polymer, and other undesired results. The addition of an acid/halogen scavenger to the composition, which has a neutralizing affect on thermally liberated acid/halogen, has been found to be very beneficial in the present invention. As used in the present application and in the appended claims, the term "acid/halogen scavenger" means a substance that neutralizes and/or absorbs acid (e.g., HCl and HBr) and/or halogen (e.g., $Cl_2$ and $Br_2$).

A preferred acid/halogen scavenger for use in the present invention is hydrotalcite. A synthetic hydrotalcite is commercially available from Kyowa Chemical Industry Co. (Japan). Any of the other acid/halogen scavengers known in the art can be used in the invention. The acid/halogen scavenger is present in the composition by weight from about 0% to about 1%. Preferably, the acid/halogen scavenger is present by weight from about 0.02% to about 1%.

Fillers

The flame retarded polyolefin composition according to the invention may also include fillers or reinforcements such as calcium carbonate (CaCO₃), mica, talc, wollastonite, fibers (e.g., fibrous glass sold by Owens Corning Fiberglass as OCF 144A 17C 5/32") or mixtures of the foregoing. When fibrous glass is used in the composition, it is preferable to include a coupling agent such as the coupling agent sold by Uniroyal as Polybond PB3200. The polymer blend generally comprises in weight percent from about 0% to about 30%, or from about 5% to about 20% fillers. Non-fiber type fillers preferably have an average particle size of from about 1 to about 14 microns. Preferably, the fillers are used in as dry a state as reasonably practical. Fiber type fillers may be either organic or mineral (inorganic) in nature. Also, mixtures of fibers may be employed. Suitable fiber materials include, for example, glass fibers, carbon fibers, jute and synthetic polymer fibers.

Miscellaneous Additives

Various additives may be included in the polymer blend composition at various levels of loading. Such additives include, for example, light stabilizers, heat stabilizers, lubricants (e.g., Strucktol TR016 bead), etc. Generally, such miscellaneous additives are included in the polymer blend at a rate of up to 3% by weight, and preferably less than 2% by weight of the polymer blend composition.

Colorants

The polymer blend compositions of the present invention also generally include colorants or pigments. Such materials may be organic or inorganic and are well known in the art. Generally, colorants or pigments are included in the polymer blend at concentrations of up to 20% by weight, and preferably less than 10% by weight of the polymer blend composition.

Additional Polymers

It will be appreciated that polymer blend compositions made in accordance with the present invention may include one or more additional polymeric materials such as, for example elastomers or rubbers such as silicone rubbers or styrene-butadiene materials, maleated materials, styrenic materials, etc. One example of an additional polymer is a styrene-butadiene block copolymer sold by Phillips as KR03. Compatibilizer polymers may also be added such as a block polymer of a vinyl aromatic monomer and a conjugated diene, a partially hydrogenated derivative thereof, or a selectively hydrogenated derivative thereof to which has been grafted an unsaturated carboxylic reagent. These additional polymers would be present in an amount up to 10% by weight and preferably less than 5% by weight of the flame retarded composition.

Preparation of Compositions

The flame retarded polyolefin composition of the present invention can be prepared by techniques well-known to those skilled in the art. For example, a particularly useful procedure is to intimately mix the polymers and other components using conventional melt mixing equipment such as a mill, a Banbury, a Brabender, a single or twin screw extruder, continuous mixers, kneaders, etc. For example, the polymers may be intimately mixed in the form of granules and/or powder in a high shear mixer. Conventional compounding equipment can generally be utilized. As used in the specification and in the appended claims, the term "intimate mixing" means that the mixture is prepared with sufficient mechanical shear and thermal energy to produce a dispersed phase which is finely divided and homogeneously dispersed in the continuous or principal phase.

EXAMPLES

Various features and aspects of the present invention are illustrated further in the examples that follow. While these examples are presented to show one skilled in the art how to operate within the scope of this invention, they are not to serve as a limitation on the scope of the invention where such scope is only defined in the claims.

It should be noted that all oven aging tests reported in the following examples were conducted in accordance with the procedures set forth in ASTM D5374-93, ASTM D5423-94, and UL746B at a temperature of 160° C. Furthermore, all results for Torque Rheometer testing reported in the following examples were obtained in accordance with the testing procedures specified in ASTM D2538, which covers the relative fusion characteristics of poly(vinyl chloride) compounds. It will be appreciated by those of skill in the art that the testing procedures of ASTM D2538 have to be slightly modified in order to obtain meaningful test data. Specifically, a fusion curve for polyolefin compositions must be used instead of a fusion curve for PVC compositions. Unless otherwise indicated in the following examples and elsewhere in the specification and in the appended claims, all parts and percentages are by weight, temperatures are in degrees centigrade, and pressures are at or near atmospheric.

Example I

Four compositions were prepared by intimately mixing the components shown in Table I below (amounts are in weight percent) in a Farrell Continuous Processor at a mixer rotor speed of about 500 rpm. The compositions were extruded at about 200° C. into strands, which were passed through a water bath. Water was removed from the surface of the strands using an air knife prior to pelletizing. Composition A does not contain a high level of antioxidant or a scavenger and is considered a control composition. Compositions 1, 2, and 3 are flame retarded polyolefin compositions according to the present invention.

TABLE I

|  | A | 1 | 2 | 3 |
|---|---|---|---|---|
| (I) Polyolefin | | | | |
| Equistar 51S12A | 69.80 | 67.25 | 68.00 | 67.25 |
| Engage POE 8999 | 10.00 | 10.00 | 10.00 | 10.00 |
| (II) Flame Retardant Additive | | | | |
| Endura 6289(PP100) | 20.00 | 20.00 | 20.00 | 20.00 |

TABLE I-continued

|  | A | 1 | 2 | 3 |
|---|---|---|---|---|
| (III) Stabilizer Package |  |  |  |  |
| Ciba Irgafos 168 | 0.10 | 1.00 | 0.50 | 0.50 |
| Ciba Irganox 1010 | 0.10 | 1.00 | 1.00 | 1.00 |
| Distearyl Thiodiproprionate | — | — | 0.50 | 0.50 |
| (IV) Acid/Halogen Scavenger |  |  |  |  |
| Hydrotalcite | — | 0.75 | — | 0.75 |

The pellets obtained were then molded into appropriate forms for various standard tests, the results of which are shown in Table II below.

TABLE II

|  | Composition A | | Composition 1 | | Composition 2 | | Composition 3 | |
|---|---|---|---|---|---|---|---|---|
| Performance Properties | Un-aged (as molded) | Oven aged @ 160° C. | Unaged (as molded) | Oven Aged @ 160° C. | Un-aged (as molded) | Oven aged @ 160° C. | Un-aged (as molded) | Oven aged @ 160 C. |
| Oven exposure before failure due to samples crazing |  | <300 Hrs. (Failed) |  | 624 Hrs. (Passed) |  | 648 Hrs (Passed) |  | 672 Hrs. (Passed) |
| Tensile Strength | 4200 psi | <2000 psi (Failed) | 4200 psi | 4200 psi (Passed) | 4300 psi | 4300 psi (Passed) | 4300 psi | 4300 psi (Passed) |
| Flammability V-0 @ 1/8"* | Passed | Failed | Passed | Passed | Passed | Passed | Passed | Passed |
| Flammability V-0 @ 1/16"* | Failed | Failed | Failed | Failed | Failed | Failed | Passed | Passed |
| Color Change after exposure |  |  |  |  |  |  |  |  |
| Delta 1, (change in color) |  | 3350 |  | 23.3 |  | 22.1 |  | 18.2 |
| Visual Rating of color |  | Darkest |  | Lighter |  | Lighter |  | Lightest |
| Torque Rheology | <5 M-g |  | 20 M-g |  | 57 M-g |  | 81 M-g |  |

*U.L. 94 Vertical Burn Rating

Example I demonstrates that Composition A (i.e., the Control), which contained a conventional stabilizer package, did not pass the 160° C. oven aging test as outlined in UL746B. Moreover, the torque rheology of Composition A was very low, and the color of the specimens produced from Composition A after oven aging were the darkest of all of the compositions tested in Example I. Composition A also failed the V-0@1/8" vertical burn test after oven aging.

In contrast to Composition A, Composition 1, which contained an unconventionally high loading of the same components of a conventional stabilizer package, did pass the number of hours of exposure before failure in the oven aging test. However, the specimens produced from Composition 1 did not have the best color retention and torque rheology properties.

Composition 2, which further included another unconventional adjustment to the stabilizer package, passed the 160° C. oven aging test and further retained 100% of the tensile properties. Specimens produced from Composition 2 were much better than specimens produced from Composition A in terms of torque rheology and color retention properties on oven aged samples.

Composition 3, which contained yet another unconventional variation on the stabilizer package, exhibited excellent oven aging properties, good retention of tensile properties, and the lightest (least amount of) color change with the best torque rheology and improved flammability rating. Such substantially improved results were unexpected.

Example II

Two compositions were prepared by intimately mixing the components shown in Table III below (amounts are in weight percent) in a Farrell Continuous Processor at a mixer rotor speed of about 500 rpm. The compositions were extruded at about 200° C. into strands, which were passed through a water bath. Water was removed from the surface of the strands using an air knife prior to pelletizing. Composition B does not contain a high level of antioxidant or a scavenger and is considered a control composition. Composition 4 is a flame retarded polyolefin composition according to the present invention.

TABLE III

|  | B | 4 |
|---|---|---|
| (I) Polyolefin |  |  |
| Union Carbide 7C50 | 29.20 | 28.13 |
| Equistar 51212A | 29.20 | 28.12 |
| (II) Flame Retardant Additive |  |  |
| Endura 6535 | 40.00 | 40.00 |
| (III) Stabilizer Package |  |  |
| Ciba Irgafos 168 | 0.30 | 0.50 |
| Ciba Irganox 1010 | 0.30 | 1.00 |
| Distearyl Thiodiproprionate | — | 0.50 |
| (IV) Acid/Halogen Scavenger |  |  |
| Hydrotalcite | — | 0.75 |
| (V) Colorants |  |  |
| Titanium Dioxide | 1.00 | 1.00 |

The pellets obtained were then molded into appropriate forms for various standard tests, the results of which are shown in Table IV below.

TABLE IV

|  | Composition B | | Composition 4 | |
| --- | --- | --- | --- | --- |
| Performance Properties | Un-age (as molded) | Oven aged @ 160° C. | Un-aged (as molded) | Oven Aged @ 160° C. |
| Oven exposure before failure due to samples crazing |  | 396 Hrs (Failed) |  | 516 Hrs. (Passed) |
| Tensile Strength | 3,600 psi | <1800 psi (Failed) | 3,660 psi | 3,660 psi (Passed) |
| Flammability V-0 @ 1/8"* | Passed | Passed | Passed | Passed |
| Flammability V-0 @ 1/16"* | Failed | Failed | Passed | Passed |
| Color Change after oven exposure Visual Rating of color |  | Darkest |  | Lightest |
| Torque Rheology | 108 M-g |  | 176–196 M-g |  |

*U.L. 94 Vertical Burn Rating

Composition 4, which contained the improved stabilizer package, had good long term heat aging properties and better color retention, improved torque rheology, and better flammability properties than Composition B, while maintaining tensile properties.

Example III

Two compositions were prepared by intimately mixing the components shown in Table V below (amounts are in weight percent) in a Farrell Continuous Processor at a mixer rotor speed of about 500 rpm. The compositions were extruded at about 200° C. into strands, which were passed through a water bath. Water was removed from the surface of the strands using an air knife prior to pelletizing. Composition C does not contain a high level of antioxidant or a scavenger and is considered a control composition. Composition 5 is a flame retarded polyolefin composition according to the present invention.

TABLE V

|  | C | 5 |
| --- | --- | --- |
| (I) Polyolefin |  |  |
| Equistar 51S12A | 80.95 | 78.50 |
| Engage POE 8999 | 7.00 | 7.00 |

TABLE V-continued

|  | C | 5 |
| --- | --- | --- |
| (II) Flame Retardant Additive |  |  |
| Endura 6653 | 9.50 | 9.50 |
| (III) Stabilizer Package |  |  |
| Ciba Irgafos 168 | 0.15 | 0.50 |
| Ciba Irganox 1010 | 0.15 | 1.00 |
| Distearyl Thiodiproprionate | — | 0.50 |
| (IV) Acid/Halogen Scavenger |  |  |
| Hydrotalcite | — | 0.75 |
| (V) Additional Polymers |  |  |
| Phillips KR03 | 2.00 | 2.00 |
| (VI) Lubricants |  |  |
| Strucktol TR016 Bead | 0.25 | 0.25 |

The pellets obtained were then molded into appropriate forms for various standard tests, the results of which are shown in Table VI below.

TABLE VI

|  | Composition C | | Composition 5 | |
| --- | --- | --- | --- | --- |
| Performance Properties | Un-aged (an molded) | Oven aged @ 160° C. | Un-aged (as molded) | Oven Aged @ 160° C. |
| Oven exposure before failure due to samples crazing |  | 576 Hrs (Passed) |  | 576 Hrs. (Passed |
| Tensile Strength | 4,200 | 4,200 | 4,200 | 4,200 |
| Flammability V-2 @ 1/8"* | Passed | Passed | Passed | Passed |
| Flammability V-2 @ 1/16"* | Failed | Failed | Passed | Passed |
| Color Change after oven exposure Visual Rating of color |  | Darkest |  | Lightest |
| Torque Rheology | 81 M-g |  | 144 M-g |  |

*U.L. 94 Vertical Burn Rating

Specimens produced using Composition 5, which included the novel stabilizer package according to the present invention, had better color retention, torque rheology properties, and enhanced as-molded flammability properties than specimens produced using Composition C.

Example IV

Two compositions were prepared by intimately mixing the components shown in Table VII below (amounts are in weight percent) in a Farrell Continuous Processor at a mixer rotor speed of about 500 rpm. The compositions were extruded at about 200° C. into strands, which were passed through a water bath. Water was removed from the surface of the strands using an air knife prior to pelletizing. Composition D does not contain a high level of antioxidant or a scavenger and is considered a control composition. Composition 6 is a flame retarded polyolefin composition according to the present invention.

TABLE VII

|  | D | 6 |
|---|---|---|
| (I) Polyolefin |  |  |
| Equistar PP8480HU | 48.55 | 41.50 |
| Engage POE 8999 | 5.00 | 5.00 |
| (II) Flame Retardant Additive |  |  |
| Endura 6535 | 30.00 | 35.00 |
| (III) Antioxidant Composition |  |  |
| Tinuvin 770 | 0.40 | — |
| Ciba Irgafos 168 | 0.15 | 0.50 |
| Ciba Irganox 1010 | 0.15 | 1.00 |
| Distearyl Thiodioprionate | — | 0.50 |
| (IV) Acid/Halogen Scavenger |  |  |
| Hydrotalcite | — | 0.75 |
| (V) Fillers/Reinforcements |  |  |
| OCF 144 17C 5/32" | 15.00 | 15.00 |
| Uniroyal Polybond PB3200 | 0.75. | 0.75 |

The pellets obtained were then molded into appropriate forms for various standard tests, the results of which are shown in Table VII below.

TABLE VIII

|  | Composition D | | Composition 6 | |
|---|---|---|---|---|
| Performance Properties | Un-aged (as molded) | Oven aged @ 160° C. | Un-aged (as molded) | Oven Aged @ 160° C. |
| Oven exposure before failure due to samples crazing |  | 372 Hrs. (Failed) |  | 1000 Hrs. (Passed) |
| Tensile Strength | 5,700 psi | 5,700 psi | 5,700 psi | 5,700 psi |
| Flammability V-0 @ 1/8"* | (Passed) | (Passed) | (Passed) | (Passed) |
| Flammability V-0 @ 1/16"* | (Failed) | (Failed) | (Passed) | (Passed) |
| Color Change after oven exposure Visual Rating of color |  | Darkest |  | Lightest |
| Torque Rheology | 9 M-g |  | 171 M-g |  |

*U.L. 94 Vertical Burn Rating

Specimens produced using Composition D, which included a conventional stabilizer package, retained acceptable tensile properties, but failed UL746B long term heat aging testing. Moreover, such specimens exhibited the most color change and most torque rheology change.

In contrast, specimens produced using Composition 6, which included applicants' novel stabilizer package, retained good tensile strength, exhibited an improved flammability rating, and did so with the least color change after aging. Composition 6 also exhibited the least torque rheology change.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What is claimed:

1. A flame retarded polyolefin composition comprising a blend of:
   (I) at least one polyolefin, said polyolefin comprising a semicrystalline homopolymer or copolymer of polypropylene;
   (II) a halogen-containing flame retardant additive;
   (III) from at least about 1.00% to about 2.5% by weight of a stabilizer package, said stabilizer package comprising by weight from about 20% to about 80% of a hindered phenolic antioxidant, from about 20% to about 80% of a phosphite-containing antioxidant, and from 25% up to about 40% of a thio-ester antioxidant; and
   (IV) from about 0.02% to about 1.0% by weight of an acid/halogen scavenger;

wherein said flame retarded polyolefin composition has a flammability rating of V-2 or better in accordance with the UL94 standard and passes the long term heat aging tests set forth in the UL746B standard.

2. A flame retarded polyolefin composition as set forth in claim 1 wherein said polyolefin (I) comprises from about 26.5% to about 95% of said composition by weight.

3. The flame retarded polyolefin composition as set forth in claim 2 wherein said polyolefin (I) comprises from about 75% to about 90% of said composition by weight.

4. The flame retarded polyolefin composition as set forth in claim 1 wherein said polyolefin (I) comprises a polypropylene having a number average molecular weight above about 10,000.

5. The flame retarded polyolefin composition as set forth in claim 4 wherein said polyolefin (I) comprises a polypropylene having a number average molecular weight above about 50,000.

6. The flame retarded polyolefin composition as set forth in claim 4 wherein said polyolefin (I) further comprises an ethylene copolymer made using a metallocene catalyst.

7. The flame retarded polyolefin composition as set forth in claim 6 wherein said ethylene copolymer comprises from about 0.5% to about 30% of said polyolefin (I) portion of said composition by weight.

8. The flame retarded polyolefin composition as set forth in claim 7 wherein said ethylene copolymer comprises from about 1% to about 20% of said polyolefin (I) portion of said composition by weight.

9. The flame retarded polyolefin composition as set forth in claim 1 wherein said polyolefin (I) is selected from the group consisting of regrind polyolefins, recycled polyolefins, wide specification polyolefins, and mixtures thereof.

10. The flame retarded polyolefin composition as set forth in claim 1 wherein said halogen-containing flame retardant additive is selected from the group consisting of brominated dipentaerithritol, tetrabromobisphenol A, ethylenebistetrabromophthalimide, ethylenebisdibromonorbornane-dicarboximide, tetrabromo-bisphenol A-bis(2,3-dibromopropyl ether), octabromodiphenyl oxide hexabromocyclododecane, hexabromodiphenoxy ethane, decabromodiphenoxy ethane, decabromodiphenyloxide, tris(tribromoneopentyl) phosphate and other halogenated bisphenol derivatives, tetradecabromodiphenoxy benzene, brominated polystyrene, tetradecabromodiphenyloxide, polydibromophenylene oxide, phenoxy terminated bisphenol A carbonate oligomers containing from about 50% to about 60% by weight bromine, brominated epoxy resins containing from about 30% to about 60% by weight bromine, and mixtures thereof.

11. The flame retarded polyolefin composition as set forth in claim 1 wherein said halogen-containing flame retardant additive comprises from about 5% to about 25% of said composition by weight.

12. The flame retarded polyolefin composition as set forth in claim 11 wherein said halogen-containing flame retardant additive comprises from about 7% to about 22% of said composition by weight.

13. The flame retarded polyolefin composition as set forth in claim 1 wherein said hindered phenolic antioxidant is selected from the group consisting of bis(2,2,6,6)-tetramethyl-4piperidinyl) sebacate, tetrakis[methylene(3,5-di-t-butyl-4-hydroxyhydrocinnamate)] methane, and mixtures thereof.

14. The flame retarded polyolefin composition as set forth in claim 1 wherein said phosphite-containing antioxidant comprises tris(2,4-di-t-buphenyl) phosphite.

15. The flame retarded polyolefin composition as set forth in claim 1 wherein said thio-ester antioxidant comprises distearyl thiodipropionate.

16. The flame retarded polyolefin composition as set forth in claim 1 wherein said acid/halogen scavenger comprises hydrotalcite.

17. The flame retarded polyolefin composition as set forth in claim 1 further comprising up to about 30% by weight of fillers and/or reinforcements.

18. The flame retarded polyolefin composition as set forth in claim 17 wherein said fillers and/or reinforcements are selected from the group consisting of calcium carbonate, mica, talc, wollastonite, fibers, and mixtures thereof.

19. The flame retarded polyolefin composition as set forth in claim 1 further comprising up to about 3% by weight of additives selected from the group consisting of light stabilizers, heat stabilizers, and lubricants.

20. The flame retarded polyolefin composition as set forth in claim 1 further comprising up to about 20% by weight of colorants and/or pigments.

21. The flame retarded polyolefin composition as set forth in claim 1 further comprising up to about 10% by weight of additional polymers.

22. The flame retarded polyolefin composition as set forth in claim 21 wherein said additional polymers are selected from the group consisting of elastomers, silicone rubbers, styrene-butadiene materials, maleated materials, styrenic materials, block polymers of a vinyl aromatic monomer and a conjugated diene, partially hydrogentated derivatives of block polymers of a vinyl aromatic monomer and a conjugated diene, selectively hydrogentated derivatives of block polymers of a vinyl aromatic monomer and a conjugated diene to which has been grafted an unsaturated carboxylic reagent, and mixtures thereof.

23. A flame retarded polyolefin composition comprising a blend of, by weight:
(I) from about 60% to about 85% of a semicrystalline homopolymer of polypropylene and from about 5% to about 15% by weight of a saturated ethylene-octene metallocene copolymer;
(II) from about 7% to about 25% of a halogen-containing flame retardant additive composition;
(III) from at least about 1.00% to about 2.5% by weight of a stabilizer package, said stabilizer package comprising by weight from about 20% to about 80% of a hindered phenolic antioxidant, from about 20% to about 80% of a phosphite-containing antioxidant, and from 25% up to about 40% of a thio-ester antioxidant; and
(IV) from about 0.5% to about 1.0% by weight of an acid/halogen scavenger, said acid/halogen scavenger comprising hydrotalcite;
wherein the flame retarded polyolefin composition has a flammability rating of V-2 or better in accordance with the UL94 standard and passes the long term heat aging tests set forth in the UL746B standard.

24. The flame retarded polyolefin composition as in claim 23 wherein said halogen-containing flame retardant additive composition comprises by weight from about 49% to about 54% tetrabromobisphenal A-bis(2,3 dibromopropyl ether), from about 25% to about 27% $Sb_2O_3$, and from about 19% to about 26% polypropylene.

25. The flame retarded polyolefin composition as in claim 23 wherein said hindered phenolic antioxidant comprises tetrakis[methylene (3,5-di-t-butyl-4-hydroxyhdrocinnamate)] methane, said phosphite-containing antioxidant comprises tris(2,4-di-t-buphenyl) phosphite, and said thio-ester antioxidant comprises distearyl thiodipropionate.

* * * * *